United States Patent [19]
Miyake et al.

[11] Patent Number: 6,126,851
[45] Date of Patent: *Oct. 3, 2000

[54] ANTIFREEZE/COOLANT COMPOSITION CONTAINING P-TOLUATE AND A MOLYBDATE

[75] Inventors: Yuji Miyake; Yasuaki Mori, both of Gifu, Japan

[73] Assignee: CCI Co., Ltd., Seki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/922,986

[22] Filed: Sep. 2, 1997

[30] Foreign Application Priority Data

Sep. 4, 1996 [JP] Japan .................................. 8-233882

[51] Int. Cl.[7] ...................................................... C09K 5/20
[52] U.S. Cl. ................................................ 252/76; 252/79
[58] Field of Search ......................................... 252/76, 79

[56] References Cited

U.S. PATENT DOCUMENTS

| | | | |
|---|---|---|---|
| 5,489,391 | 2/1996 | Nawa et al. | 252/75 |
| 5,811,025 | 9/1998 | Kawai et al. | 252/70 |

FOREIGN PATENT DOCUMENTS

| | | |
|---|---|---|
| 0242900 | 10/1987 | European Pat. Off. . |
| 7-157886 | 6/1995 | Japan . |
| 8-85782 | 4/1996 | Japan . |

*Primary Examiner*—Christine Skane
*Attorney, Agent, or Firm*—James P. Hanrath

[57] ABSTRACT

A glycol-based antifreeze/coolant concentrate to be blended in coolant in a cooling system of a vehicle is disclosed, which can effectively inhibit occurrence of cavitation damage in the cooling system while suppressing production of nitrosoamine which is a known carcinogenic substance. A glycol-based antifreeze/coolant concentrate of the present invention contains a 0.05–8.0 wt. % p-toluate and a 0.01–1.0 wt. % molybdate.

7 Claims, 1 Drawing Sheet

ANTIFREEZE/COOLANT COMPOSITION CONTAINING P-TOLUATE AND A MOLYBDATE

BACKGROUND OF THE INVENTION

1) Field of the Invention

This invention generally relates to an antifreeze/coolant concentrate. More particularly, this invention relates to an antifreeze/coolant concentrate which is capable of effectively inhibiting cavitation damage in a cooling system for a vehicle.

2) Prior Art

Vehicle engine cooling systems include metal portions made of aluminum, aluminum alloy, cast iron, steel, brass, solder and/or copper. These metal portions are prone to corrosion by contacting water and/or air contained in coolant water (coolant) which circulates through cooling systems. In order to prevent metal corrosion, an antifreeze/coolant concentrate or other concentrates containing metal corrosion inhibitors are blended in coolant in an appropriate concentration.

Metal portions of a cooling system can be damaged by other causes as well. Due to air (oxygen) unavoidably dissolved in coolant, so-called "cavitation" is generated in circulating coolant from local pressure differences, which will considerably damage metal portions, especially iron or cast iron portions of cooling systems. Such cavitation can also be generated by vibration of cooling systems. Generally, larger vehicles produce more vibration than smaller vehicles.

A nitrite is often contained in conventional antifreeze/coolant concentrates in an attempt to inhibit such cavitation damage in cooling systems. It is generally accepted that a nitrite in coolant provides a protective layer on metal surfaces, specifically on iron surfaces, and protects the metal (iron) portions from cavitation damage.

Whatever the actions may be, it is proved that a nitrite is capable of very effectively inhibiting cavitation damage in a cooling system. However, nitrites often produce harmful nitrosoamine by reacting with an amine salt or salts in coolant, which is a carcinogenic substance. Since no other effective cavitation damage inhibitors were known, antifreeze/coolant concentrates containing a "substantial" amount of nitrite have continually been used in coolant, though their use is not altogether advisable from the foregoing point of view.

Accordingly, it is an object of the present invention to provide an antifreeze/coolant concentrate containing no nitrites, which can still effectively inhibit cavitation damage onto metal portions of a cooling system for a vehicle engine, especially for a large vehicle engine where substantial vibration is generated.

The foregoing object of the present invention should be construed as including an object to provide an effective cavitation damage inhibiting antifreeze/coolant concentrate without necessity to contain so much nitrite as was conventionally regarded necessary to effectively inhibit cavitation damage so that production of environmentally harmful nitrosoamine in coolant may be substantially suppressed.

SUMMARY OF THE INVENTION

Antifreeze/coolant concentrates of the present invention are glycol based. Such a glycol may be ethylene glycol, propylene glycol, 1,3 butylene glycol, hexylene glycol, diethylene glycol or glycerin, among which ethylene glycol and propylene glycol are preferred.

It was discovered by the present inventors through trial and error that use of an appropriate amount of a p-toluate or p-toluates and a molybdate or molybdates can effectively inhibit cavitation damage when blended together in an antifreeze/coolant concentrate. It was also discovered that an addition of an appropriate amount of a benzoate or benzoates, or p-tert butyl benzoic acid to such an antifreeze/coolant concentrate can promote inhibition of cavitation damage.

An appropriate concentration of a benzoate (benzoates), p-tert butyl benzoic acid and molybdate (molybdates) was also found to effectively inhibit cavitation damage when blended together in an antifreeze/coolant concentrate. An addition of a p-toluate (toluates) to such an antifreeze/coolant concentrate was found to promote cavitation damage inhibition.

Further, it was discovered that an appropriate concentration of a benzoate (benzoates) and p-toluate (toluates) can also effectively inhibit cavitation damage when blended together in an antifreeze/coolant concentrate. An addition of p-tert butyl benzoic acid to such an antifreeze/coolant concentrate was found to improve its cavitation damage inhibitory power.

Accordingly, an antifreeze/coolant concentrate of the present invention containing a glycol or glycols as a main ingredient further contains a p-toluate or p-toluates in an amount of 0.05–8.0 weight percent (wt. %) and a molybdate or molybdates in an amount of 0.01–1.0 wt. %. Besides providing an effective cavitation damage inhibition, p-toluates are known to effectively prevent corrosion of aluminum and iron (cast iron) in coolant and to hardly produce deposition in hard water. Molybdates are also known to also provide an effective metal corrosion inhibition.

Such a p-toluate may be an alkali metal salt, ammonium salt or amine salt of p-toluic acid, of which an alkali metal salt is preferred. Among such alkali metal salts, sodium salt and potassium salt are preferred. Use of a p-toluate more than the range 0.05–8.0 wt. % is uneconomical, while use less than that range will not provide a sufficient cavitation damage inhibition.

Such a molybdate may be an alkali metal salt, ammonium salt or amine salt of a molybdenic acid, among which an alkali metal salt is preferred. Among such alkali metal salts, sodium salt and potassium salt are preferred. Use of a molybdate less than the range 0.01–1.0 wt. % will not provide a sufficient cavitation damage inhibition, while use more than that range can cause oxidation of glycols and degrade the glycols.

Such an antifreeze/coolant concentrate can additionally contain a benzoate or benzoates in an amount of 0.05–8.0 wt. %. Benzoates are known to effectively inhibit corrosion of aluminum, cast aluminum and iron (cast iron). Such a benzoate may be sodium benzoate or potassium benzoate. Use of a benzoate more than the range 0.05–8.0 wt. % is uneconomical, while use less than that range will not effectively promote cavitation damage inhibition.

Such an antifreeze/coolant concentrate can additionally contain p-tert butyl benzoic acid in an amount of 0.05–8.0 wt. % instead of a benzoate (benzoates). P-tert butyl benzoic acid is known to effectively inhibit corrosion of aluminum and iron (cast iron) and to hardly produce precipitation in hard water. Use of p-tert butyl benzoic acid less than the range 0.05–8.0 wt. % will not provide a sufficient cavitation damage inhibition, while use more than that range is uneconomical.

Such an antifreeze/coolant concentrate can be provided without containing any nitrites since such an antifreeze/coolant concentrate is sufficiently cavitation damage inhibitory. Nitrites will produce harmful nitrosoamine by reacting with an amine salt or salts in coolant. Nitrosoamine is known to be a carcinogenic substance.

Another glycol-based antifreeze/coolant concentrate of the present invention contains an appropriate amount of a benzoate or benzoates (0.05–8.0 wt. %), p-tert butyl benzoic acid (0.05–8.0 wt. %) and a molybdate or molybdates (0.01–1.0 wt. %). An appropriate concentration of these three ingredients provides an excellent inhibition of cavitation damage in a cooling system. Such an antifreeze/coolant concentrate can further contain an appropriate concentration of a p-toluate or toluates (0.05–8.0 wt. %) to provide an improved inhibition of cavitation damage. Such an antifreeze/coolant concentrate need not include any nitrites to provide an efficient cavitation damage inhibition.

Still another glycol-based antifreeze/coolant concentrate according to the present invention contains an appropriate amount of a benzoate or benzoates (0.05–8.0 wt. %) and a p-toluate or toluates (0.05–8.0 wt. %). Such a combination of ingredients provides an excellent inhibition of cavitation damage. An appropriate amount of p-tert butyl benzoic acid (0.05–8.0 wt. %) may be added to such an antifreeze/coolant concentrate to improve its cavitation damage inhibition. Such an antifreeze/coolant concentrate need not contain any nitrites to provide a sufficient cavitation damage inhibition.

Antifreeze/coolant concentrates of the present invention may additionally contain an appropriate amount (0.05–1.0 wt. %) of a triazole or triazoles such as benzotriazole, tolyltriazole, 4-phenyl-1,2,3-triazole, 2-naphthotriazole and/or 4-nitrobenzotriazole to provide an additional metal corrosion inhibitory property. Antifreeze/coolant concentrates of the present invention may additionally contain an appropriate amount (0.01–1.0 wt. %) of a nitrate or nitrates such as sodium nitrate and/or potassium nitrate and/or an appropriate amount (0.01–1.0 wt. %) of a magnesium compound or compounds such as magnesium hydroxide, magnesium oxide, magnesium carbonate, magnesium sulfate, magnesium nitrate, magnesium benzoate, magnesium glutamate, magnesium succinate, magnesium phthalate, magnesium salicylate, magnesium maleate and/or magnesium chloride to provide an additional metal corrosion inhibitory property. Further, antifreeze/coolant concentrates of the present invention may additionally contain an antifoamer, pH modifier and/or coloring agent.

Tests were conducted to evidence the efficacies of such antifreeze/coolant concentrates prepared according to the present invention, The detail of the tests and results are given in the detailed description of preferred embodiments.

BRIEF DESCRIPTION OF THE DRAWING

Tables being provided together with a detailed description for easier reference, the attached

DETAILED DESCRIPTION OF PREFERRED EMBODIMENTS

Figure 1:
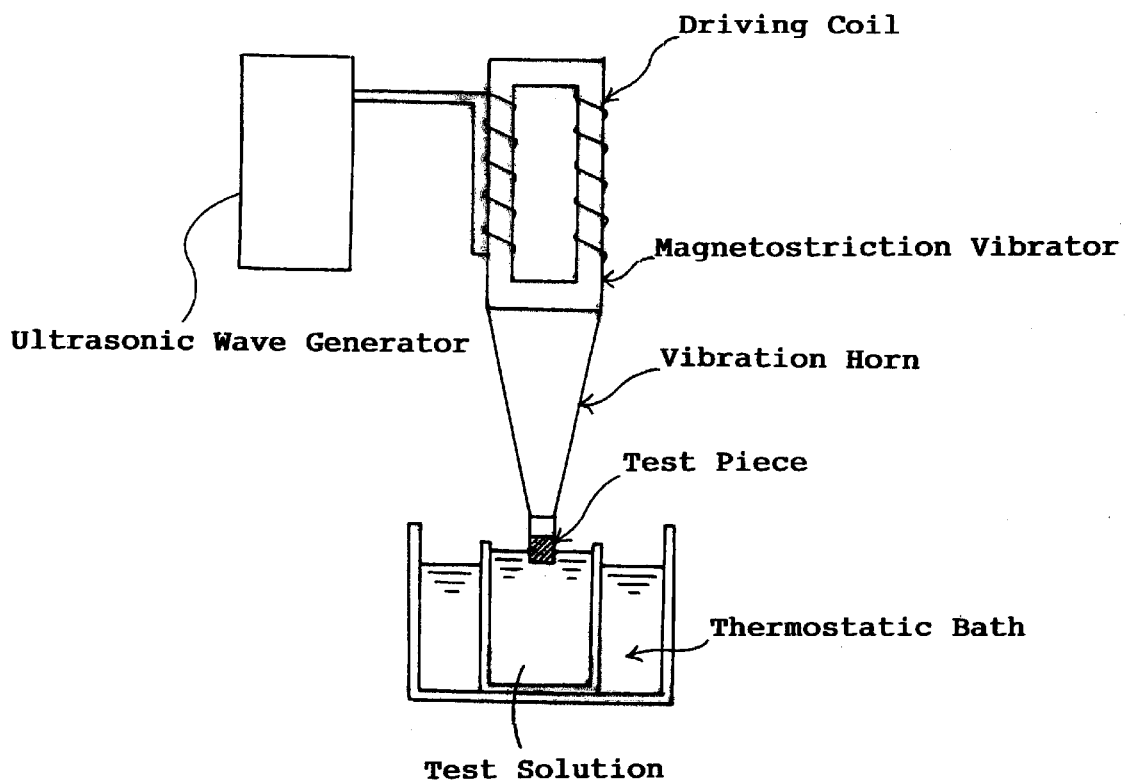
FIG. 1 shows a diagrammatic front view of a device used in the tests to prove the efficacies of antifreeze/coolant concentrates prepared according to the present invention.

Antifreeze/coolant concentrates prepared for the tests were ethylene glycol based. The test samples prepared were Embodiments 1–4 according to the present invention, Comparisons 1–3, and Controls (conventional samples) 1 and 2.

These test samples all included 2.0 wt. % water as well as a respective amount of potassium hydroxide and tolyltriazole.

Comparison 1 contained an amount of sodium benzoate and p-tert butyl benzoic acid without p-toluic acid, which is not covered by the present invention. Comparison 2 contained as little as 0.005 wt. % sodium molybdate while Embodiment 4 contained 0.1 wt. % sodium molybdate. Comparison 3 contained as little as 0.03 wt. % p-toluic acid while Embodiment 3 contained 1.0 wt. % p-toluic acid. Controls 1 and 2 both contained 4.0 wt. % 2-ethylhexanoic acid and 0.25 wt. % sebacic acid, Control 2 additionally containing 0.9 wt. % sodium nitrite. None of Embodiments 1–4 and Comparisons 1–3 contained a nitrite.

The components (ingredients) of Embodiments 1–4, Comparisons 1–3 and Controls 1 and 2 are given in wt. % in Table 1 (next page).

TABLE 1

| Ingredient | Embodiment | | | | Comparison | | | Control | |
|---|---|---|---|---|---|---|---|---|---|
| | 1 | 2 | 3 | 4 | 1 | 2 | 3 | 1 | 2 |
| P-Toluic acid | 3.0 | 1.0 | 1.0 | | | | 0.03 | | |
| Sodium Benzoate | | 4.5 | 4.5 | 4.5 | 4.5 | 4.5 | 4.5 | | |
| P-Tert Butyl Benzoic Acid | | 2.0 | 2.0 | 2.0 | 2.0 | 2.0 | 2.0 | | |
| Sodium Molybdate | 0.1 | 0.1 | | 0.1 | | 0.005 | | | |
| Tolyltriazole | 0.3 | 0.3 | 0.3 | 0.3 | 0.3 | 0.3 | 0.3 | 0.2 | 0.2 |
| 2-Ethylhexanoic Acid | | | | | | | | 4.0 | 4.0 |
| Sebacic Acid | | | | | | | | 0.25 | 0.25 |
| Sodium Nitrite | | | | | | | | | 0.9 |
| Water | 2.0 | 2.0 | 2.0 | 2.0 | 2.0 | 2.0 | 2.0 | 2.0 | 2.0 |

TABLE 1-continued

| | Embodiment | | | | Comparison | | | Control | |
|---|---|---|---|---|---|---|---|---|---|
| Ingredient | 1 | 2 | 3 | 4 | 1 | 2 | 3 | 1 | 2 |
| Ethylene Glycol | 93.4 | 89.0 | 89.1 | 90.5 | 91.2 | 91.2 | 91.2 | 91.8 | 90.9 |
| Potassium Hydroxide | 1.26 | 1.07 | 1.07 | 0.63 | 0.02 | 0.02 | 0.02 | 1.72 | 1.72 |

Cavitation damage inhibition tests were conducted using an ultrasonic cavitation erosion (magnetostriction) apparatus shown in FIG. 1 and identical cast iron test pieces under the conditions defined in Table 2 in a simulation of cavitation damage to a cooling system of a vehicle engine, and the reductions in weight of the test cast iron pieces were respectively measured. Table 3 shows the results of the measurements in reduction of weight (the average).

TABLE 2

Test Condition

| Item | Condition |
|---|---|
| Frequency | 19 KHz |
| Amplitude | 30 μm |
| Piece Material | FC200 (cast iron) |
| Piece Dimension | Disk (diameter:16 mm) |
| Concentration | 20% JIS Preparation Water |
| Solution | 500 ml |
| Temperature | 50° C. |
| Submergence Depth | 4 mm |

TABLE 3

Test Result

| | Embodiment | | | | Comparison | | | Control | |
|---|---|---|---|---|---|---|---|---|---|
| | 1 | 2 | 3 | 4 | 1 | 2 | 3 | 1 | 2 |
| Original weight (mg) | 273.3 | 302.3 | 302.8 | 464.7 | 436.4 | 418.1 | 473.6 | 368.3 | 395.1 |
| 13,000+ Reduction (mg) | 38.3 | 37.2 | 47.1 | 66.0 | 117.6 | 108.9 | 112.3 | 120.9 | 52.3 |

From Table 3, the following analysis can be made. Embodiments 1–3 each showed an excellent cavitation damage inhibition which was greater than that of Control 2 containing a nitrite. Embodiment 4 also showed a satisfactory cavitation damage inhibition which was slightly inferior to that of Control 2. Control 1 containing no nitrite showed a poor cavitation damage inhibition. Comparisons 1–3 all failed to show meaningful cavitation damage inhibition.

From the results of the foregoing tests, it can be safely concluded, though the precise actions are not presently known, that: (1) an appropriate concentration, in an antifreeze/coolant concentrate, of a p-toluate and a molybdate with a possible addition of a benzoate or p-tert butyl benzoic acid; (2) an appropriate concentration of a benzoate, p-tert butyl benzoic acid and molybdate with a possible addition of a p-toluate; and (3) an appropriate concentration of a benzoate and p-toluate with a possible addition of p-tert butyl benzoic acid, can each provide an excellent cavitation damage inhibition in coolant, without any assistance of a nitrite.

It is naturally presumed that an addition of a minimum amount of a nitrite to any embodiment sample would have provided an improved cavitation damage inhibition.

Accordingly, the present invention can totally eliminate use of nitrites or can at least significantly reduce use of nitrites to provide excellent cavitation damage inhibitory antifreeze/coolant concentrates.

The present invention is described in the above using the foregoing embodiments, however, it should be understood that those embodiments are meant for illustration of the present invention only. Therefore, it is possible for a person skilled in the art to modify or change such embodiments within the scope of the attached claims.

What is claimed is:

1. A glycol-based antifreeze/coolant concentrate consisting essentially of a glycol or glycols as a base, at least one p-toluate in an amount of 0.05–8.0 wt. %, at least one molybdate in an amount of 0.01–1.0 wt. %, and at least one benzoate in an amount of 0.05–8.0 wt. %.

2. A glycol-based antifreeze/coolant concentrate of claim 1, further consisting essentially of p-tert butyl benzoic acid in an amount of 0.05–8.0 wt. %.

3. A glycol-based antifreeze/coolant concentrate according to claim 1 containing no nitrite.

4. A glycol-based antifreeze/coolant concentrate consisting essentially of a glycol or glycols as a base, at least one benzoate in an amount of 0.05–8.0 wt. % at least one p-toluate in an amount of 0.05–8.0 wt. %, and p-tert butyl benzoic acid in an amount of 0.05–8.0 wt. %.

5. A glycol-based antifreeze/coolant concentrate of claim 4 containing no nitrite.

6. A glycol-based antifreeze/coolant concentrate according to claim 1 further consisting essentially of one or more of a triazole or triazoles in an amount of 0.05–1.0 wt. %, a nitrate or nitrates in an amount of 0.01–1.0 wt. %, or a magnesium compound or compounds in an amount of 0.01–1.0 wt. %.

7. A glycol-based antifreeze/coolant concentrate according to claim 4 further consisting essentially of one or more of a triazole or triazoles in an amount of 0.05–1.0 wt. %, a nitrate or nitrates in an amount of 0.01–1.0 wt. %, or a magnesium compound or compounds in an amount of 0.01–1.0 wt. %.

* * * * *